United States Patent [19]

Farmer et al.

[11] Patent Number: 5,884,220
[45] Date of Patent: Mar. 16, 1999

[54] METHOD AND APPARATUS TO IMPROVE OVERALL PERFORMANCE OF A DGPS RECEIVER

[75] Inventors: Dominic Gerard Farmer, Milpitas; Mark E. Nichols, Sunnyvale, both of Calif.

[73] Assignee: Trimble Navigation Limited, Sunnyvale, Calif.

[21] Appl. No.: 680,681

[22] Filed: Jul. 16, 1996

[51] Int. Cl.[6] .................................................. G01S 5/02
[52] U.S. Cl. ........................ 701/215; 342/358; 342/457
[58] Field of Search .................................. 701/213, 214, 701/215; 342/357, 457, 358; 375/336, 346

[56] References Cited

U.S. PATENT DOCUMENTS

| | | | |
|---|---|---|---|
| 5,148,179 | 9/1992 | Allison ..................................... | 342/357 |
| 5,323,322 | 6/1994 | Mueller et al. .......................... | 364/449 |
| 5,345,244 | 9/1994 | Gildea et al. ............................ | 342/357 |
| 5,436,632 | 7/1995 | Sheynblat ................................ | 342/357 |
| 5,477,458 | 12/1995 | Loomis .................................... | 364/449 |
| 5,495,257 | 2/1996 | Loomis .................................... | 342/357 |
| 5,523,761 | 6/1996 | Gildea ..................................... | 342/357 |
| 5,523,763 | 6/1996 | Loomis .................................... | 342/357 |
| 5,563,607 | 10/1996 | Loomis et al. ........................... | 342/357 |
| 5,563,917 | 10/1996 | Sheynblat ................................ | 375/346 |
| 5,621,646 | 4/1997 | Enge et al. ............................... | 364/449 |
| 5,691,723 | 11/1997 | King et al. ............................... | 341/178 |

OTHER PUBLICATIONS

"RTCM Recommended Standards for Differential Navstar GPS Service", Radio Technical Commission for Maritime Services, Version 2.0, RTCM Special Committee No. 104, Jan. 1, 1990, pp. i–ii, 1–1 through 6–21.

*Primary Examiner*—Michael Zanelli
*Attorney, Agent, or Firm*—Blakley, Sokoloff, Taylor & Zafman LLP

[57] ABSTRACT

Measurement corrections transmitted from reference stations at known positions are transmitted to differential Global Position System receivers for use in computation of position information relative to the receiver. In one embodiment, circuitry included in the receiver detects errors in transmissions of measurement correction data streams from the closest reference station and replaces erroneous portions of the data streams with corresponding portions received from a second reference station. Alternately, a plurality of measurement correction data streams received from a plurality of reference stations are combined to produce a combined measurement correction used to correct the position information received from satellites.

39 Claims, 5 Drawing Sheets

METHOD AND APPARATUS TO IMPROVE OVERALL PERFORMANCE OF A DGPS RECEIVER

BACKGROUND OF THE INVENTION

1. Field of the Invention

The present invention relates to navigation systems, and more particularly to an improved navigation and position method using Global Positioning System (GPS) receiver stations.

2. Art Background

To assist sea, air, and land navigation and other purposes, the United State Government has placed a number of satellites in orbit around the earth in such a manner that, from any point on the earth, a user operating a roving receiver from an airplane or a ship may always have a line of sight on at least four satellites. This system is referred to as the Global Positioning System (GPS). A GPS receiver receives GPS data from the satellites; from the GPS data the roving receiver can determine its position. The GPS data includes data regarding the position of the satellite. However, the GPS data is corrupted by the U.S. Government in order to degrade the accuracy of calculations performed. Such errors are easily eliminated using the proper decoding algorithms and codes; however, such information is only available to the U.S. Military. Also, atmospheric and meteorological conditions, electromagnetic interference from terrestrial sources and other satellites, kinematic motion or orientation of the plane or ship the roving receiver is located on, and other uncertainties further degrade the signals.

To ameliorate this problem, land-based reference stations at fixed, known locations have been erected to receive satellite transmissions and interpret the signals to generate measurement corrections, also referred to as DGPS (differential GPS) corrections. Using the true, known position of the receiver antenna at each reference station, these land-based reference stations derive measurement corrections that adjust the GPS data to produce more accurate results. These measurement corrections are transmitted, for example, via minimum shift keying (MSK) transmissions, to the roving receivers as deviations or offsets to be added to the measurements derived by the roving receiver from the GPS signals received directly from the satellites. An example of such a system is the Differential GPS NAVSTAR system operated by the U.S. Coast Guard to help ships navigate more accurately.

The use of reference stations has become so widespread, and the number of reference stations has grown so large, that it is quite likely that a receiver is in range of several reference stations at once. When this happens, very often the signal received from the reference station closest to the roving receiver is used to the exclusion of all others, since that signal, relative to those of the other reference stations, is usually the strongest signal and has the shortest signal path length. This method of operation reduces spatial decorrelation errors. The other measurement correction signals originating from other reference stations, although available to the roving receiver and containing measurement corrections, are generally ignored. This is justified by the fact that the likelihood of erroneous transmission increases with distance, and that the spatial decorrelation errors in the correction increase with distance.

SUMMARY OF THE INVENTION

It is an object of the present invention to provide an improved method of navigation and apparatus using Global Positioning System (GPS) data and multiple sources of differential correction data.

In one embodiment, adjusted measurement corrections are used to "fill" gaps in unadjusted measurement corrections that are received from a preferred reference station. The gaps are caused by transmission link errors. A roving receiver performs a parity check on the data received from the preferred reference station to determine whether a transmission link error has occurred. Replacement corrections received from one or more alternate reference stations are adjusted for common mode differences which exist between the preferred station and the alternate stations.

In an alternate embodiment, the adjusted measurement correction is generated as a weighted average of the measurement corrections received from a plurality of reference stations.

In another embodiment, the common mode difference can be used to perform an integrity check on the data. For example, the detection of common mode difference values that vary significantly from prior recorded difference values can function as a flag to the receiver that errors exist. Also, measurement corrections received from the closest reference station can be compared to measurement corrections received from alternate reference stations to determine inconsistencies which affect the integrity of the data.

BRIEF DESCRIPTION OF THE DRAWINGS

The objects, features and advantages of the present invention will be apparent from the following detailed description in which.

DETAILED DESCRIPTION

The present invention organizes information from several reference stations that receive position information from the Global Positioning System (GPS) satellites, determines the magnitude of errors associated with the satellite transmissions, and re-transmits corrections to these errors to a roving receiver. The roving receiver uses the measurement corrections received from reference stations to adjust the pseudo range and pseudo range rate change measurements that the roving receiver takes from the received satellite signal. The corrected measurements are then used to produce an estimate of the roving receiver's position and velocity. When one or more reference stations are inoperative, however, the present invention organizes data from one or more functioning reference stations and forms adjusted measurement corrections at the roving receiver.

Alternately, because erroneous measurement corrections are potentially worse than the absence of measurement corrections, in an alternate embodiment, the present invention also checks the measurement corrections generated by reference stations to determine if the measurement corrections may be erroneous, and only uses measurement corrections that appear to be error free. Therefore, the system of the present invention corrects for the noise and other error sources carried by the satellite transmissions, and further compensates for the errors that occur during transmission of the measurement corrections from the reference stations to the roving receivers.

Although the methods and apparatus of the present invention are hereafter described with reference to GPS satellites, it will be appreciated that the teachings are equally applicable to positioning systems which utilize pseudolites or a combination of satellites and pseudolites. Pseudolites are ground based transmitters which broadcast a PRN code (similar to a GPS signal) modulated on an L-band carrier signal, generally synchronized with GPS time. Each transmitter may be assigned a unique PRN code so as to permit identification by a remote receiver. Pseudolites are useful in situations where GPS signals from an orbiting satellite might be unavailable, such as tunnels, mines, buildings or other enclosed areas. The term "satellite", as used herein, in intended to include pseudolite or equivalents of pseudolites, and the term GPS signals, as used herein, is intended to include GPS-like signals from pseudolites or equivalents of pseudolites.

It will be further appreciated that the methods and apparatus of the present invention are equally applicable for use with the GLONASS and other satellite-based positioning systems. The GLONASS system differs from the GPS system in that the emissions from different satellites are differentiated from one another by utilizing slightly different carrier frequencies, rather than utilizing different pseudo-random codes.

Figure 1:
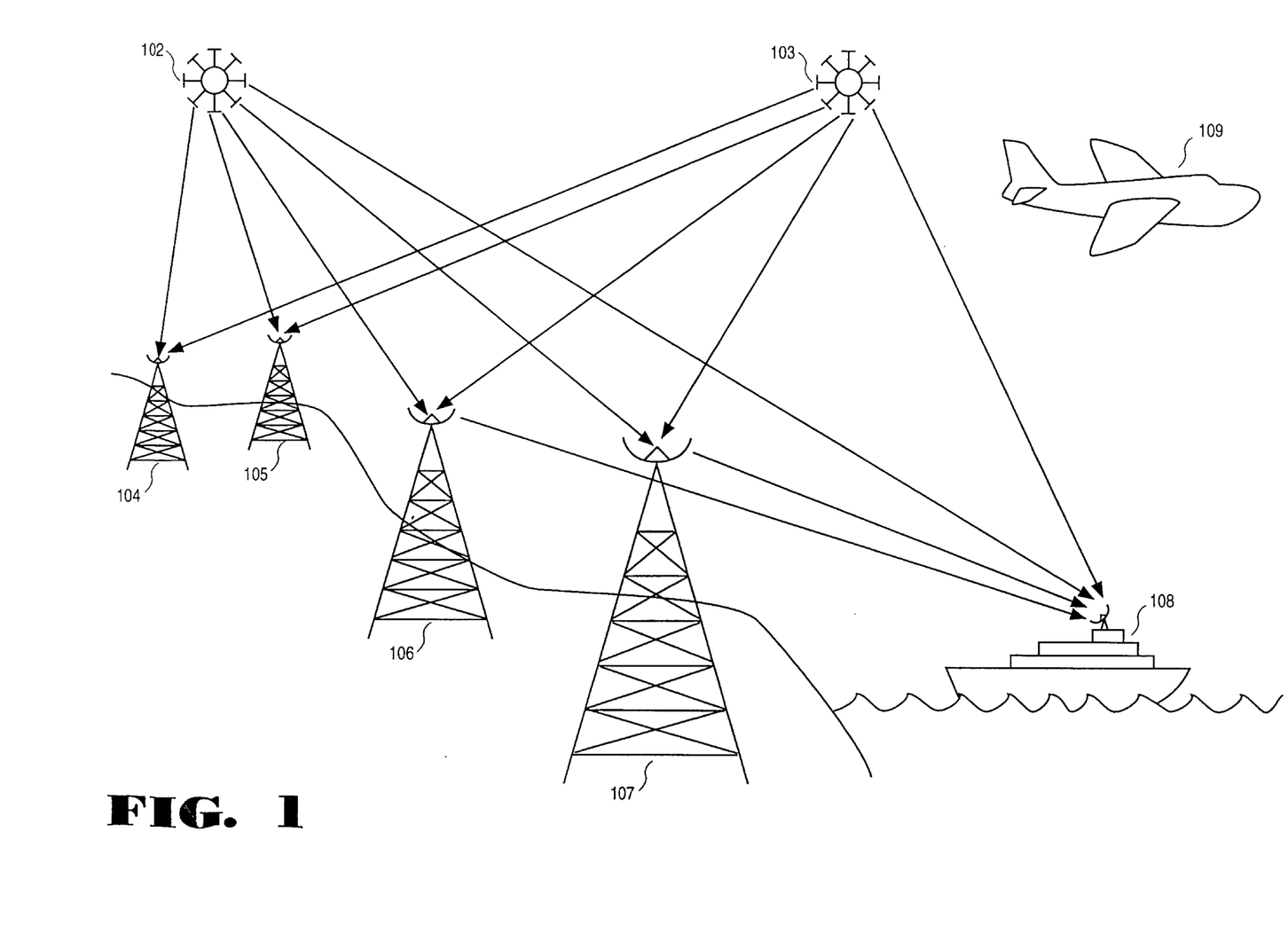
FIG. 1 is an illustrative diagram of the differential GPS environment.

Referring to FIG. 1, a number of satellites 102, 103 associated with the GPS encircling the earth transmit their positions in a broadcast mode to all points within their respective fields of view on the earth's surface. Land-based reference stations 104, 105, 106, 107 and roving receivers located on sea vessel 108 and aircraft 109 can determine their positions using the GPS data directly received from the satellites ("uncorrected GPS data"). Although examples of roving receivers are given as receivers located on or as part of moveable objects, the roving receiver can be part of a stationary object that receives both the uncorrected GPS data and measurement corrections. Furthermore, although the reference stations described herein are land-based, it is readily apparent that the reference stations are not limited as such so long as the reference stations can generate and transmit the measurement corrections to the roving receiver.

Signals received directly from a satellite are corrupted by a number of error sources. These include the effects of Selective Availability (SA) that are deliberately introduced by the Department of Defense (DOD) to limit the accuracy of non-military receivers. Other direct signal errors include Ephemeris prediction errors in both satellite position and satellite time/frequency offsets and errors in the estimation of ionosphere and troposphere delay. To combat the effects of the errors, a reference station located in a known position develops a measurement correction for each satellite, which, when added to the uncorrected measurement obtained by the reference station, will result in the correct position being obtained. The measurement corrections are transmitted, for example, by MSK transmitters, and are received by MSK receivers at the roving receiver. The roving receivers use the measurement corrections to correct the uncorrected GPS data to generate more accurate position and navigation information.

The system of the present invention takes advantage of the fact that most roving receivers are within range of receiving signals containing measurement corrections from a plurality of reference stations. Although previously it has been assumed that the best results are achieved by using measurement corrections only from the reference station closest in physical distance to the roving receiver, the system of the present invention utilizes data from additional reference stations to minimize errors that may occur in the measurement corrections received from the closest reference station.

Figure 2A:
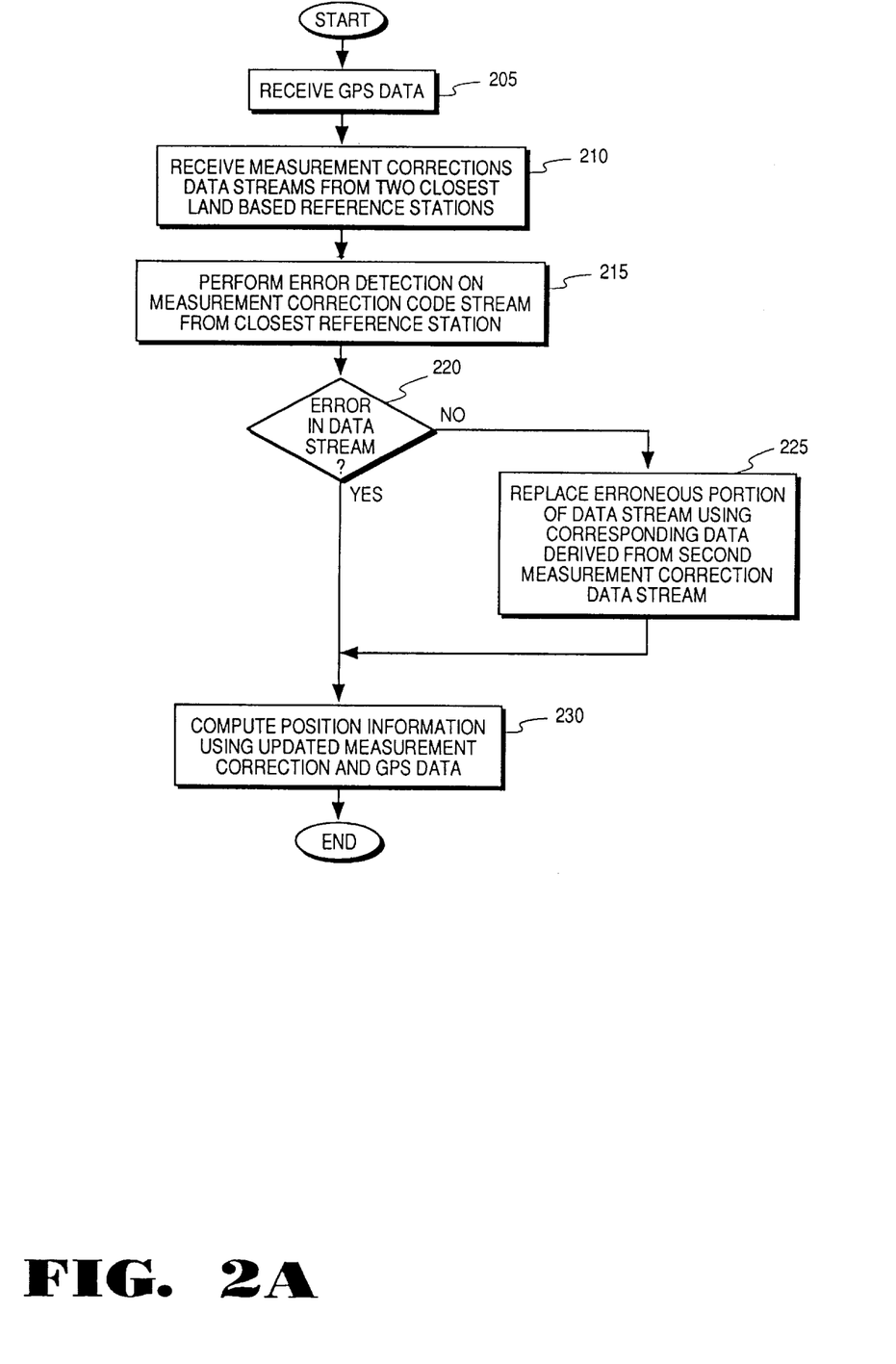
FIG. 2a and FIG. 2b are simplified flow charts illustrating embodiments of the method of the present invention.

One embodiment of the process of the present invention is generally described with reference to FIG. 2a. Referring to FIG. 2a, at step 205, the roving receiver receives uncorrected GPS data. At step 210, measurement correction data streams are received from more than one reference station, for example, the two closest reference stations. As noted earlier, reception of measurement corrections from two reference stations is not problematic as most roving receivers are typically within range of multiple reference stations. Alternately, data from other reference stations (not necessarily the two closest) can be used.

An error detection process is performed on the measurement correction data streams received from the closest reference station, step 215. A variety of error detection processes are contemplated to detect errors caused by, for example, dropped bits in the data stream. In the present embodiment, checksums or parity determinations are computed and compared to the checksums or parity values transmitted in the measurement correction data stream. If the values do not match, a transmission error has occurred.

At step 220, if an error is found in the measurement correction data stream, the erroneous portion of the measurement correction data stream is replaced with data derived from a corresponding portion of a measurement correction data stream received from an alternate reference station such as the second closest reference station. It is acknowledged that measurement corrections received from the closest reference station provide the best measurement correction. Therefore, only the portion of the measurement correction data stream found to be defective is replaced with measurement correction data that is derived from the measurement correction data stream received from the alternate reference station.

The replacement data derived from the measurement correction data stream of the alternate reference station may be generated in a variety of ways. For example, the replacement data may simply be the corresponding measurement correction data received from the alternate reference station. Preferably, the data from the alternate reference station is adjusted to account for common mode difference that exists between signals received from different reference stations. Typically, this common mode difference is due to a time bias and frequency bias caused by the two reference stations using unsynchronized clocks.

Figure 3:
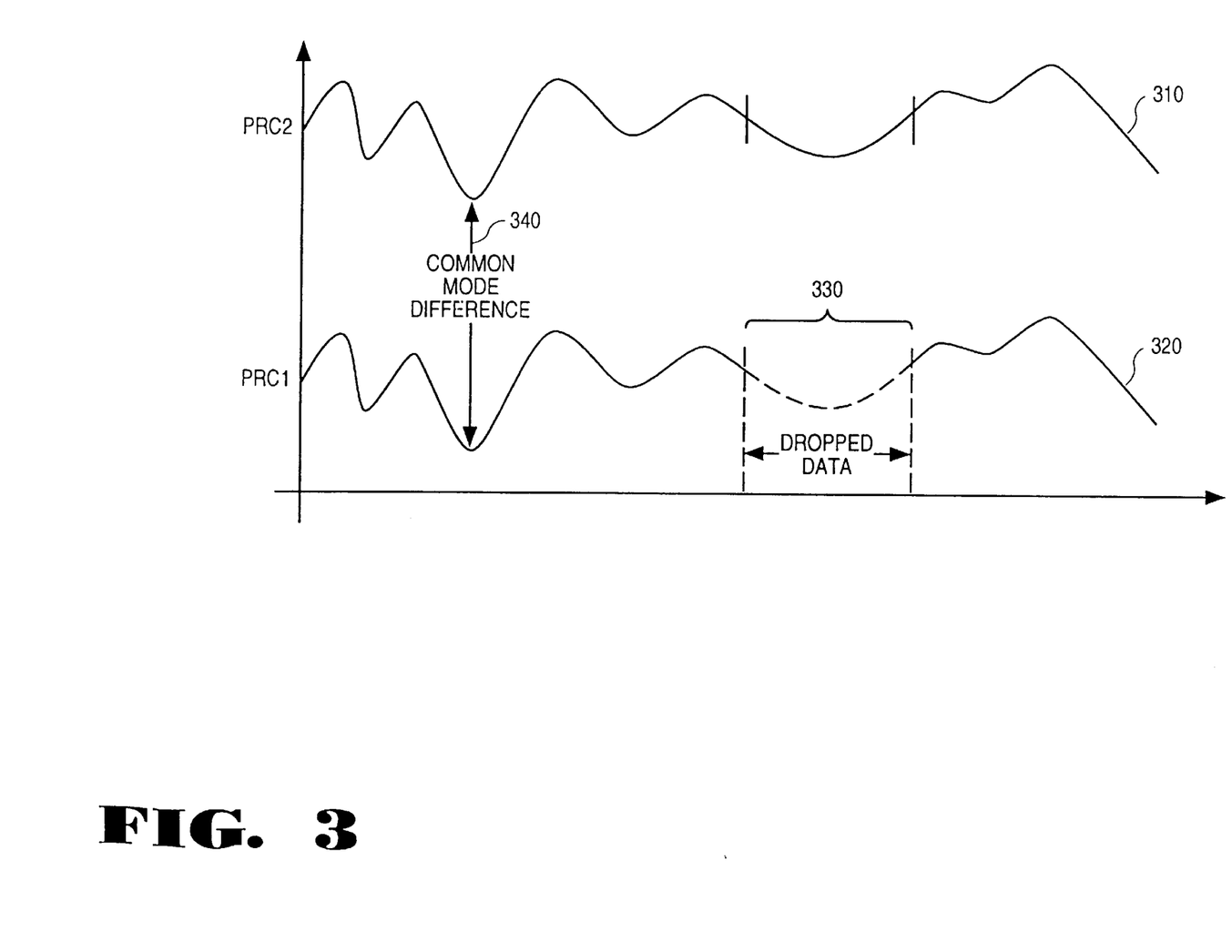
FIG. 3 illustrates wave forms received from a reference station.

Referring to FIG. 3, the drawing illustrates two wave forms 310, 320, representative of the measurement correction data streams for a single satellite received respectively from a first reference station which is closest to the roving receiver, and a second reference station, which is next closest to the roving receiver. Area 330 represents a portion of the first data stream in which transmission link errors occurred. As noted above, these errors can be detected using known techniques such as parity and checksum tests. Prior to the detection of transmission link errors (e.g., dropped bits), the roving receiver calculates a common mode difference 340 between the first and second wave forms 310, 320. Preferably, this is computed on a continuous or periodic basis to maintain current information.

As noted above, the common mode difference preferably includes the time bias and frequency bias that occurs between reference station clocks. Thus, in one embodiment, the common mode difference takes into the account the time bias that occurs due to the varying distances from the satellite, as uncorrected GPS data is used by the reference station to generate the measurement corrections. The time bias reflects the fact that the oscillators used by the reference stations are not phase locked. As can be seen by the similarity in wave forms in FIG. 3, the correction code data received from both reference stations are approximately the same except for the time bias and the frequency bias. Thus, in an alternate embodiment, the common mode difference further takes into account the rate bias which occurs between reference stations. As before, the rate bias occurs as the reference station oscillators are not frequency locked.

Although the common mode difference due to the time bias and the frequency bias can be calculated prior to the detection of any errors and factored into the replacement data, it is preferred that all the measurement corrections received from the reference stations be continuously adjudted to eliminate for the time/frequency bias such that biases are adjusted to approximately zero. A variety of techniques can be applied to minimize the effect of the time and frequency biases. For example, a mean value of the pseudo range measurement corrections (PRC) received from each reference station can be determined and subtracted from each pseudo range measurement correction received to remove the time bias. Similarly, a mean value of the range rate corrections (RRC) received from a reference station can be compared and subtracted from each range rate correction.

Preferably, the process is performed for multiple groups of measurement corrections at a plurality of snapshots in time to produce a plurality of mean values. These mean values are filtered to produce a constant mean value that can be applied to subsequent measurement corrections received. This process relies in part on the observation that reference stations utilize extremely stable oscillators. Therefore, after a plurality of measurement corrections over a period of time are received, e.g., over a period of 0.10–0.90 seconds, the mean values can be combined in a variety of ways to produce a constant mean value. For example, one way is to average the mean values together.

A preferred technique to handle the common mode time and frequency bias difference between reference stations is to estimate the value of the biases difference for each satellite's measurement correction. The most recent corrections are given the most weight and corrections whose age exceeds a predetermined threshold are not considered.

Consider the following general example where measurement corrections $PRC_{AN}(T_1)$, $RRC_{AN}(T_1)$ and $PRC_{BN}(T_2)$, $RRC_{BN}(T_2)$ and differential corrections for satellite N generated by reference stations A and B are valid at times $T_1$ and $T_2$, respectively. [$PRC_{AN}(T_1)$ is the pseudo range correction from reference station A for satellite N at time $T_1$; $RRC_{AN}(T_1)$ is the range rate correction from reference station A for satellite N at time $T_1$; $PRC_{BN}(T_2)$ is the pseudo range correction from reference station B for satellite N at time $T_2$; and $RRC_{BN}(T_2)$ is the range rate correction from reference station B for satellite N at time $T_2$.]

If the correction time delta ($T_2-T_1$) exceeds a base threshold, then the effects of SA acceleration are considered to be too large for a valid bias comparison to be made. Measurements indicate that SA acceleration rarely exceeds $0.01$ m/s$^2$. Therefore, using a base threshold of 10 seconds would allow an SA contribution of only $0.5 \times 0.001 \times 10^2 = 0.5$ meters.

An estimate of the time bias difference between the reference stations is obtained by propagating the corrections from time $T_1$ to time $T_2$:

Time Bias Difference Estimate $(T_2) = PRC_{AN}(T_1) + (T_2-T_1) \times RRC_{AN}(T_1) - PRC_{BN}(T_2)$. Similarly, the frequency bias difference estimate is obtained by differencing the two range rate corrections:

Frequency Bias Difference Estimate $(T_2) = RRC_{AN}(T_1) - RRC_{BN}(T_2)$

The Time Bias Difference Estimate and Frequency Bias Difference Estimate are applied to Time Difference and Frequency Difference filters, respectively, using weights that are a function of the size of the time difference. If the time difference is small, then the estimates are given a greater weight than if the time difference is large. This reduces the effect of SA acceleration on the filtered results.

The above process is repeated for all satellites and correction sets. The filtered outputs of Time Bias Difference and Frequency Bias Difference can then be used to modify corrections received from reference station A to appear as if they were received from reference station B, and vice-versa. The modified corrections from station A can then be used to fill in for corrections missing from station B.

In another embodiment, the modified corrections from station A and the unmodified corrections from station B can always be used in the roving receiver's determination of position and velocity. This has the added benefit of increasing the correction update rate and reducing overall latency, even in an error-free environment.

Figure 2B:
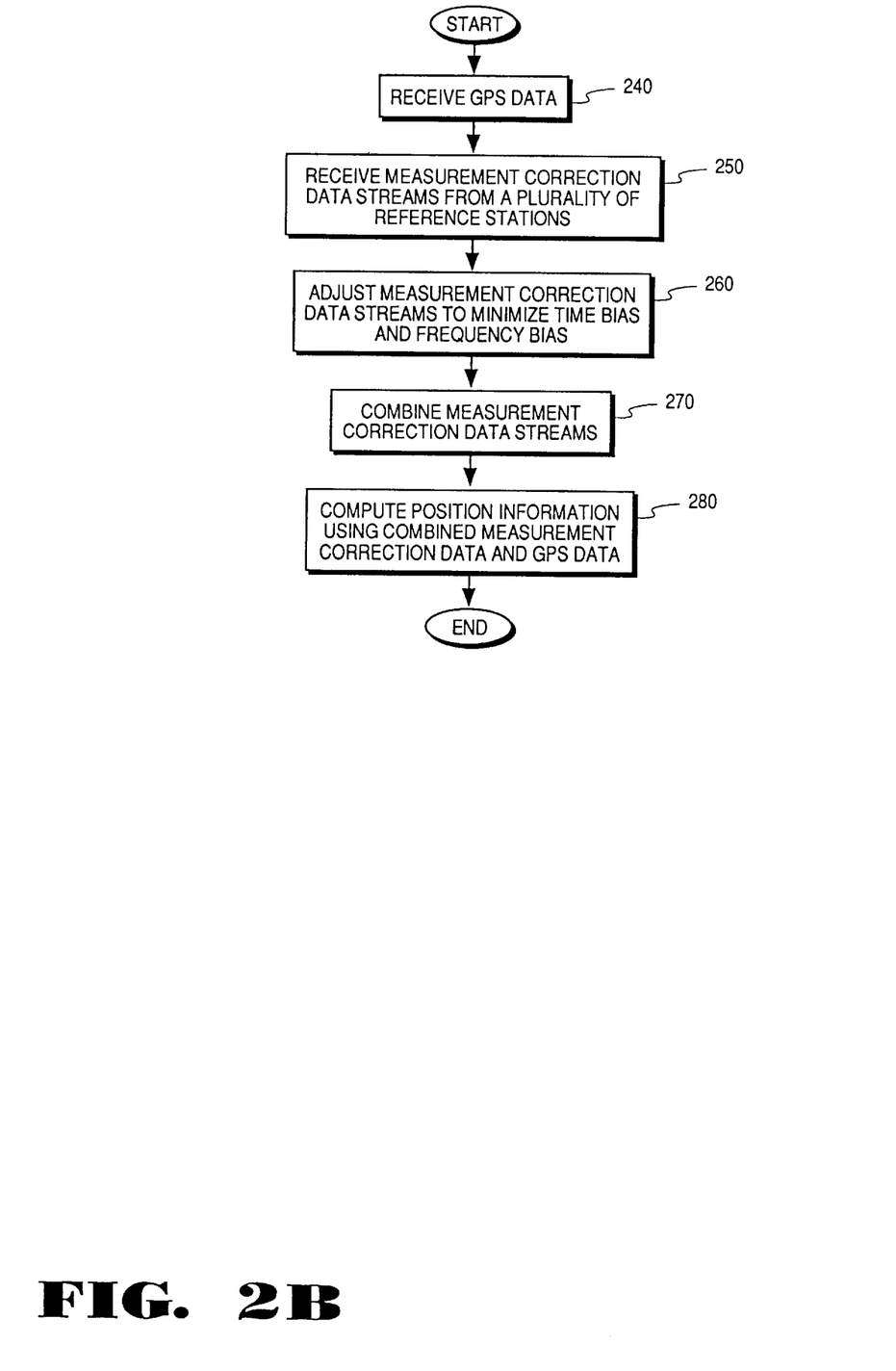

As noted earlier, the measurement correction received from one reference station, for example, the closest reference station, can be adjusted as needed to compensate for error using a corresponding portion of the measurement correction data received from alternate reference station(s). In an alternate embodiment, the measurement corrections received from a plurality of reference stations can be combined to produce a single measurement correction used by the roving receiver to correct the uncorrected GPS data. Referring to FIG. 2b, at step 240, the uncorrected GPS data is received at the roving receiver. At step 250, the measurement corrections are received from a plurality of reference stations. The received measurement corrections are adjusted to minimize the time and frequency bias, step 260. At step 270, the measurement corrections are then combined to form a combined measurement correction that is used, along with the GPS data, to compute position information regarding the roving receiver, step 280. For example, one method to combine the measurement corrections is to use weighting functions to minimize the effects of errors in transmission of the measurement corrections received from different reference stations.

A variety of weighting functions and parameters are contemplated. For example a simple weighting function could be the summation of percent values of the data originating from a plurality of reference stations, the percent value corresponding to the distance of the transceiver from the receiver. More particularly, measurement corrections originating from the closest transceiver would be given greater weight than the data originating from other transceivers.

By continuously combining the measurement corrections, the need to detect errors is eliminated. Alternately, the combined measurement corrections is used only when an error in transmission from the first transceiver is detected to provide the corresponding replacement data for the erroneous portions or the entire measurement correction as discussed above. Measurement corrections obtained from multiple reference stations can be combined using a least squares technique to mitigate the errors associated with measurement correction latency and spatial decorrelation.

In addition, multiple reference stations can be used to perform integrity monitoring of the transmissions received from the reference station primarily providing the measurement corrections, such as the closest reference station. For example, the common mode difference among the reference stations can be monitored to detect when significant jumps in the common mode difference occurs. This indicative of error in the transmission originating from one of the reference stations. The roving receiver can respond to detection of jumps in the common mode difference measured a variety of ways. For example, the roving receiver may be programmed to drop the current transmission of measurement corrections received and wait for the next transmission. Alternately, the roving receiver may utilize measurement corrections received from an alternate reference station.

Figure 4A:
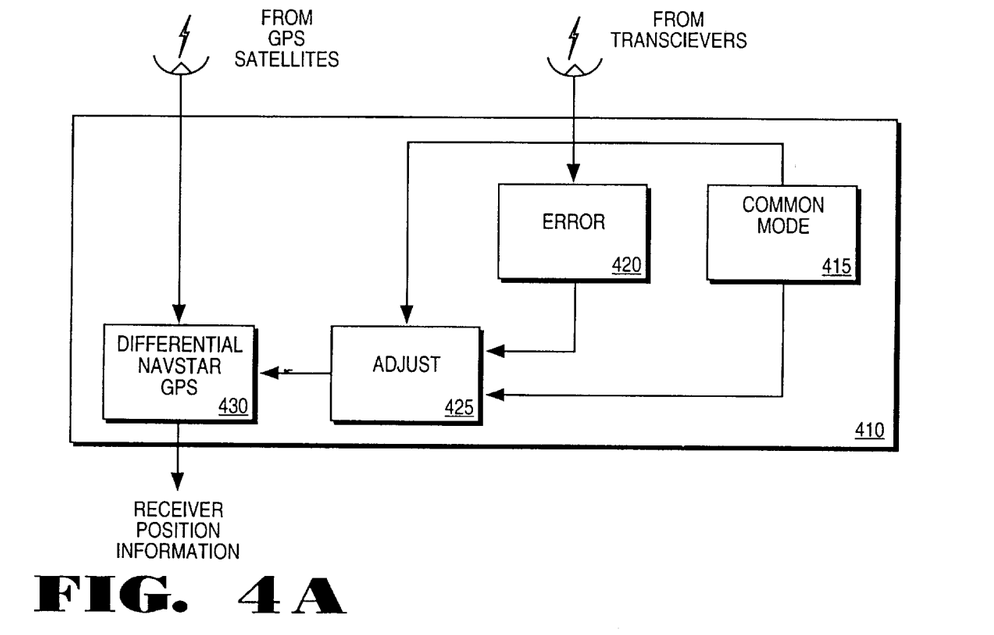
FIG. 4a and FIG. 4b are simplified block diagrams that illustrate embodiments of receivers in accordance with the teachings of the present invention.
Figure 4B:
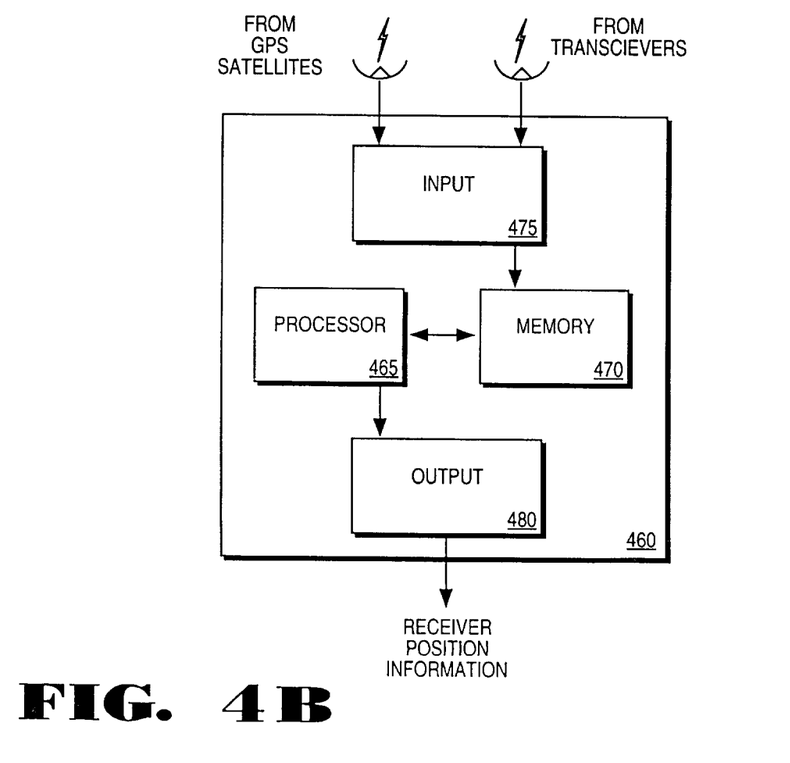

Simplified block diagrams of illustrative receivers are illustrated in FIGS. 4a and 4b. FIG. 4a is illustrative of a differential GPS receiver 410 that utilizes measurement corrections in accordance with the teachings of the present invention. Preferably the receiver 410 includes a MSK receiver for receiving measurement corrections and operates in accordance with specifications set forth by the Radio Technical Commission For Maritime Services (RTCM) for Differential NAVSTAR GPS Service (RTCM Special Committee No.104, P.O. Box 19087, Washington, D.C. 20036). However, it is contemplated that the invention is readily applicable to other types of receivers.

Other sources of differential GPS information transmitted over a variety of media can also be used. For example, differential measurement corrections can be received over FM subcarrier signals (such as radio and television broadcast channels), from satellites (whether geostationary or otherwise) or across media such as cable, telephone or cellular telephone connections. The advantage to some of the alternate media is a greater number of reference stations is accessible to the roving receiver. Although the roving receiver of the present embodiment is described as receiving a measurement corrections from a single type of reference station (e.g., MSK transmitting reference station), it is contemplated that the roving receiver is configured to receive measurement corrections from a variety of types of reference stations that transmit across alternate media, such as the media described above. The media across which the measurement corrections are received can be selectable by the roving receiver. For example, based upon integrity or error checks, the receiver can be programmable to switch to the media providing the best measurement correction data. Alternately, the receiver can switchably receive measurement corrections from a variety of reference station sources and combine the measurement corrections after adjustment for common mode differences.

Referring to FIG. 4b, the receiver 410 includes receivers 415, 420 combining circuit 415, error detection circuit 425, and position determining circuit 430. This configuration of circuitry is illustrative; other configurations are readily apparent.

The roving receiver 410 includes multiple receivers 415, 420 which are compatible with the transmissions by the reference stations. Although the receivers 415, 420 are depicted as two physically separate receivers, both receiving MSK signals, it is preferred that one set of receiver hardware is utilized and software/firmware is used to tune to adjust the hardware to individually receive each transmission from each reference station within reception range of the roving receiver 410.

The measurement corrections received from the reference stations by the receivers 415, 420 are input to combination circuit 425. For purposes of discussion, the combination circuit is shown herein in block diagram form; a variety of hardware/software/firmware can be used to implement the functionality described herein. Preferably, the combination circuitry adjusts each set of measurement corrections received from each reference station to minimize the time and frequency bias. In addition, depending upon the embodiment used, the combination circuit 425 also checks for data validity using RTCM parity error checks on the measurement correction data and measurement correction integrity (e.g., using the common mode difference). The combination circuit 425 further combines the measurement corrections adjusted to minimize the time and frequency bias to produce combined measurement corrections utilized by the GPS receiver circuitry 430 to calculate the position of the roving receiver.

As noted above, a variety of circuitry to implement the functionality described above can be used. Another example is illustrated by the block diagram of FIG. 4b. In this embodiment, the receiver 460 includes a processor 465, that executes functions in accordance with code stored in a memory 470. The memory 470 is also available to store data used in the calculations. The processor can be a variety of types including those referred to as signal processors, general purpose processors, microcontrollers and the like. The GPS data and measurement correction data streams are received through input ports 475. The processor 465 performs the computations necessary to minimize the time and rate bias, detect errors, combine the measurement correction data streams and compute the position of the roving receiver. The receiver position is output through output port 480.

The invention has been described in conjunction with the preferred embodiment. It is evident that numerous alternatives, modifications, variations and uses will be apparent to those skilled in the art in light of the foregoing description.

What is claimed is:

1. A receiver system comprising:
    a first receiver for receiving position information transmitted from at least one source;
    at least one second receiver for receiving a plurality of measurement corrections transmitted respectively from a plurality of reference stations;
    a combination circuit coupled to receive the plurality of measurement corrections, said combination circuit configured to produce a combined measurement correction by replacing erroneous data of one of the measurement corrections with replacement data from another of the measurement corrections; and
    a position determination circuit coupled to the combination circuit and the first receiver for determining the location of the receiver system using the position information and the combined measurement correction.

2. The receiver system as set forth in claim 1, wherein the combination circuit performs a parity check on a first measurement correction data of the plurality of measurement corrections and substitutes portions of the first measurement correction data with corresponding portions of a second measurement correction data of the plurality of measurement corrections when parity errors are detected in the portions of the first measurement correction data.

3. The receiver system as set forth in claim 1, wherein the combination circuit further adjusts the measurement corrections to minimize a time bias and frequency bias of the measurement corrections prior to producing the combined measurement correction.

4. The receiver system as set forth in claim 1, wherein the combined measurement correction comprises a combination of at least two measurement correction data of the plurality of measurement corrections.

5. The receiver system as set forth in claim 2, wherein the first measurement correction data is transmitted by a first reference station of the plurality of reference stations and the second measurement correction data is transmitted by a second reference station of the plurality of reference stations, the first reference station being located closest in physical proximity to the receiver system and the second reference station being second closest to the receiver system.

6. The receiver system as set forth in claim 1, wherein the combination circuit continuously combines measurement correction data of the plurality of measurement corrections.

7. The receiver system as set forth in claim 6, wherein the combination circuit combines using a least squares method.

8. The receiver system as set forth in claim 6, wherein the combination circuit combines using a weighted average of the plurality of measurement corrections, each weight dependent upon the distance the receiver system is from the reference station that transmitted measurement correction data of the plurality of measurement corrections.

9. The receiver system as set forth in claim 1, wherein the at least one second receiver comprises a minimum shift keying (MSK) receiver.

10. The receiver system as set forth in claim 1, wherein the at least one second receiver comprises an FM subcarrier receiver.

11. The receiver system as set forth in claim 1, wherein the at least one second receiver comprises a receiver to receive measurement corrections from a satellite.

12. The receiver system as set forth in claim 1, wherein the at least one second receiver comprises a connection to a telephone system.

13. The receiver system as set forth in claim 1, wherein the at least one second receiver comprises different types of receivers for selectively receiving measurement corrections across different types of media.

14. A Global Positioning System (GPS) receiver system comprising:
- a first receiver for receiving GPS data transmitted from at least one satellite;
- at least one second receiver for receiving a first measurement correction transmitted from a first reference station closest in distance to the first receiver and at least one second measurement correction transmitted from at least one second reference station further in distance from the first receiver than the first reference station;
- a measurement correction adjustment circuit coupled to receive the first measurement correction and the at least one second measurement correction, said measurement correction adjustment circuit generating a combined measurement correction as the weighted combination of the first measurement correction and the at least one second measurement correction, the combined measurement correction being generated through the replacement of erroneous portions of the first measurement correction with portions of at least one second measurement correction; and
- a position determination circuit for determining the location of the receiver system based upon the GPS data and the combined measurement correction.

15. The receiver system as set forth in claim 14, wherein the combination circuit further adjusts the measurement corrections to minimize a time bias and frequency bias of the measurement corrections prior to combining the measurement corrections.

16. The receiver system as set forth in claim 14, wherein the measurement correction adjustment circuit determines weights given to each measurement correction based upon the distance between the reference station and receiver system, wherein greater weight is given to a measurement correction transmitted from shorter distances from the receiver system.

17. A Global Positioning System (GPS) receiver system comprising:
- a first receiver for receiving GPS data transmitted from at least one satellite;
- at least one second receiver for receiving a first measurement correction transmitted from a first reference station and at least one second measurement correction transmitted from at least one second reference station;
- a circuit coupled to receive the first measurement correction and the at least one second measurement correction, said circuit computing a common mode difference between the first measurement correction and the at least one second measurement correction and determining when the common mode difference varies significantly to indicate an error in transmission.

18. The receiver system as set forth in claim 17, wherein the at least one second receiver comprises a different types of receivers for selectively receiving measurement corrections across different types of media, the type of receiver selected based upon the common mode difference.

19. The receiver system as set forth in claim 17, wherein the common mode difference is derived from the time bias between reference stations.

20. The receiver system as set forth in claim 17, wherein the common mode difference is derived from the rate bias between reference stations.

21. The receiver system as set forth in claim 17, wherein the at least one second reference station comprises a reference station next closest in distance to the receiver system.

22. A Global Positioning System (GPS) receiver system comprising:
- a first receiver for receiving GPS data transmitted from at least one satellite;
- at least one second receiver for receiving a plurality of measurement corrections transmitted respectively from a plurality of reference stations;
- a processing circuit coupled to receive the GPS data and the plurality of measurement corrections, the processing circuit detecting errors in a first measurement correction data of the plurality of measurement corrections, replacing erroneous data detected in the first measurement correction data with replacement data, and determining the location of the receiver system based upon the GPS data and the first measurement correction data adjusted as needed to compensate for errors.

23. The receiver system as set forth in claim 22, wherein the replacement data comprises a corresponding portion of a second measurement correction data of the plurality of measurement corrections, adjusted by a common mode difference.

24. The receiver system as set forth in claim 23, wherein the common mode difference is derived from a time bias between reference stations.

25. The receiver system as set forth in claim 23, wherein the common mode difference is derived from a rate bias between reference stations.

26. The receiver system as set forth in claim 22, wherein the replacement data comprises a weighted combination of the first measurement correction data and the second measurement correction data.

27. The receiver system as set forth in claim 22, wherein the replacement data comprises a weighted combination of a group of measurement correction data of the plurality of the measurement corrections.

28. The receiver system as set forth in claim 22, wherein a first measurement correction data of the plurality of measurement corrections is transmitted by a first reference station of the plurality of reference stations that is closest in distance to the receiver system and a second measurement correction data of the plurality of measurement corrections is transmitted by a second reference station of the plurality of reference stations located second closest in distance to the receiver system.

29. A Global Positioning System (GPS) receiver system comprising:
- a first receiver for receiving position information transmitted from at least one satellite;
- at least one second receiver for receiving a plurality of measurement corrections transmitted from a plurality of reference stations;
- a processing circuit coupled to receive the plurality of measurement corrections and configured to generate a combined measurement correction from the plurality of measurement corrections by replacing erroneous portions of one of measurement corrections with portions of at least one other of the plurality of measurement corrections and to determine the location of the receiver system based upon the position information and the combined measurement correction.

30. The receiver system as set forth in claim 29, wherein the processing circuit performs a weighted combination of the plurality of measurement corrections and determines weights given to measurement corrections based upon the distance between a corresponding reference station of the plurality of reference stations and the receiver system, wherein greater weight is given to measurement corrections transmitted from reference stations closer in distance to the receiver system.

31. In a receiver system for receiving position information transmitted from at least one first source, a method for correcting position information comprising the steps of:
- receiving a plurality of measurement corrections transmitted from a plurality of reference stations;
- detecting errors in a first measurement correction of the plurality of measurement corrections;
- if an error is detected in the first measurement correction, replacing erroneous portions of the first measurement correction with replacement data; and
- determining the location of the receiver system based upon the position information and the first measurement correction adjusted as needed when errors are detected.

32. The method as set forth in claim 31, further comprising the step of adjusting the plurality of measurement corrections to account for time bias and frequency bias.

33. The method as set forth in claim 31, wherein the step of replacing erroneous data comprises the steps of generating replacement data by combining a group of measurement corrections of the plurality of measurement corrections to generate combined measurement correction data and replacing erroneous portions of the first measurement correction data with corresponding portions of the combined measurement correction data.

34. The method as set forth in claim 31, wherein the step of replacing erroneous data comprises the step replacing erroneous portions of the first measurement correction data with corresponding portions of a second measurement correction data of the plurality of measurement corrections.

35. In a receiver system for receiving position information transmitted from at least one first source, a method for correcting position information comprising the steps of:
- receiving a plurality of measurement corrections transmitted from a plurality of reference stations;
- generating a combined measurement correction from the plurality of measurement corrections by replacing erroneous portions of at least one of the measurement corrections with portions of at least one other of the measurement corrections; and
- determining the location of the receiver system based upon the position information and the combined measurement correction.

36. The method as set forth in claim 35, wherein the step of generating comprises the steps of determining weighted values of measurement corrections based upon the distance between a reference station of the plurality of reference stations that transmitted the measurement correction and the second receiver, wherein greater weight is given to measurement corrections transmitted from reference stations closer in distance to the second receiver, adding the weighted values and averaging the sum.

37. The method as set forth in claim 35 wherein the step of generating comprises the steps of generating the combined measurement correction from the plurality of measurement corrections using a least squares method.

38. The method as set forth in claim 35, further comprising the step of adjusting the plurality of measurement corrections to minimize a time bias and frequency bias.

39. In a receiver system for receiving position information transmitted from at least one first source, a method for monitoring data integrity comprising the steps of:
- receiving a plurality of measurement corrections transmitted from a plurality of reference stations; and
- computing a common mode difference among the measurement corrections and determining when the common mode difference varies significantly to indicate an error in transmission.

* * * * *

UNITED STATES PATENT AND TRADEMARK OFFICE
CERTIFICATE OF CORRECTION

PATENT NO.    : 5,884,220
DATED         : March 16, 1999
INVENTOR(S)   : Farmer et al.

It is certified that error appears in the above-identified patent and that said Letters Patent is hereby corrected as shown below:

In column 5 at line 19 delete "adjudted" and insert --adjusted--

Signed and Sealed this

Sixteenth Day of November, 1999

Attest:

Q. TODD DICKINSON

*Attesting Officer*     *Acting Commissioner of Patents and Trademarks*